(No Model.)

W. J. McCAUSLAND.
MEAT SOFTENER.

No. 538,459. Patented Apr. 30, 1895.

Witnesses:
H. D. Goodwin
Fred C. Benner.

Inventor:
William J. McCausland
by his Attorneys
Howsen & Howsen

UNITED STATES PATENT OFFICE.

WILLIAM J. McCAUSLAND, OF CAMDEN, NEW JERSEY.

MEAT-SOFTENER.

SPECIFICATION forming part of Letters Patent No. 538,459, dated April 30, 1895.

Application filed November 19, 1894. Serial No. 529,311. (No model.)

*To all whom it may concern:*

Be it known that I, WILLIAM J. MCCAUSLAND, a citizen of the United States, residing in Camden, New Jersey, have invented certain Improvements in Meat-Softeners, of which the following is a specification.

The object of my invention is to provide a simple and effective device for cutting or softening tough meat in order to render the same palatable and easy to masticate, a further object being to combine the device with a table knife so that it is available for use at any time. These objects I attain in the manner hereinafter set forth, reference being had to the accompanying drawings, in which—

Figure 1:
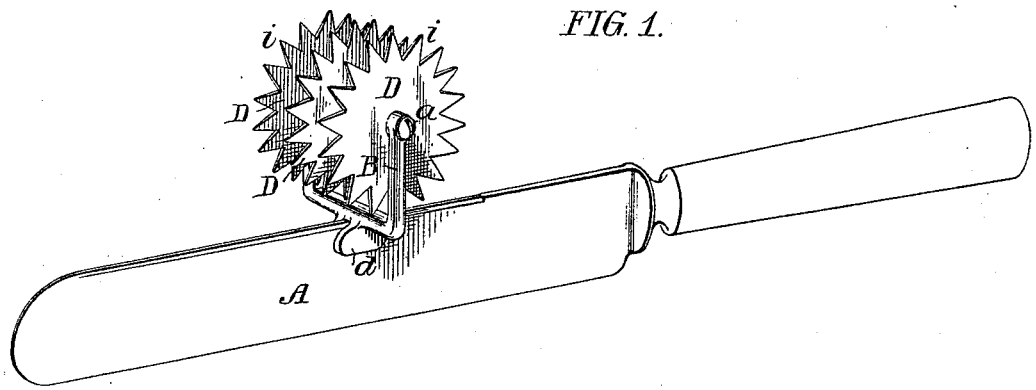
Figure 2:
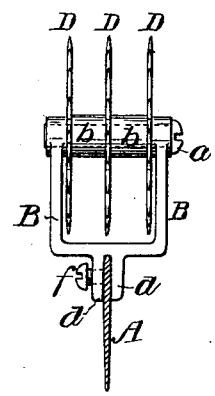

Figure 1 is a perspective view of a table-knife provided with my improved meat cutting and softening device. Fig. 2 is a transverse section of the knife, showing the attachment in elevation; and Fig. 3 is a perspective view of part of one of the cutting-blades, showing the character of the teeth of the same.

A represents the blade of an ordinary table knife and upon the back of this blade is mounted a frame B containing a series of cutters D free to turn upon a transverse shaft or pin $a$ and properly separated from each other by means of interposed sleeves or washers $b$.

The frame B has, at the base, projecting jaws $d$ for embracing the back of the knife blade and one of these jaws is provided with a set screw $f$, whereby the frame may be rigidly clamped upon the back of the blade A.

Figure 3:
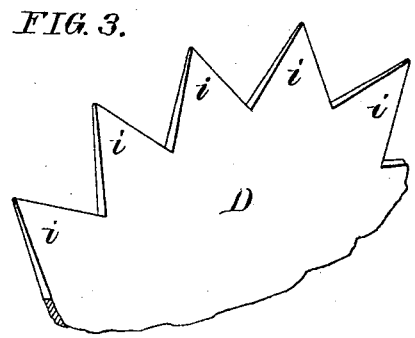

Each of the cutters D has, around its periphery, a series of A-shaped teeth $i$ which are ground off on each side so as to be beveled from base to top, as shown in Fig. 3, so that each blade presents a sharp point.

In using the device, the knife is reversed in the hand and moved back and forth so that the rotatable cutters will act upon all portions of the meat, the sharp pointed teeth penetrating the mass of meat so as to sever the muscular tissues of the same and free the contained juices, the result being that meat of the toughest character is reduced to such a condition that it can be readily cut with a knife and easily masticated, while at the same time the meat is much improved in flavor owing to the release of the meat juices.

Having thus described my invention, I claim and desire to secure by Letters Patent—

The combination of a table knife, with a frame carrying a series of rotatable cutters and provided with jaws whereby it can be secured upon the back of the knife blade, substantially as specified.

In testimony whereof I have signed my name to this specification in the presence of two subscribing witnesses.

WILLIAM J. McCAUSLAND.

Witnesses:
 FRANK E. BECHTOLD,
 JOSEPH H. KLEIN.